United States Patent [19]
Latz et al.

[11] Patent Number: 6,123,252
[45] Date of Patent: Sep. 26, 2000

[54] PROCESS FOR FIXING A GRAPHITE-RICH MATERIAL ONTO A METALLIC BODY

[75] Inventors: Wilhelm Latz; Ulrich Sussel, both of Frankfurt; Sevket Harmanci, Offenbach, all of Germany

[73] Assignee: Deutsche Carbone AG, Frankfurt, Germany

[21] Appl. No.: 09/272,565

[22] Filed: Mar. 19, 1999

[51] Int. Cl.⁷ .............................. B23K 1/19; B23K 31/02
[52] U.S. Cl. ................... 228/262.2; 228/120; 228/122.1; 228/262.1
[58] Field of Search ................................ 228/262.1, 120, 228/121, 122.1, 141.1, 164, 262.2; 219/602, 603, 616, 85.1, 85.21

[56] References Cited

U.S. PATENT DOCUMENTS

| | | | |
|---|---|---|---|
| 3,634,569 | 1/1972 | Emanuelson et al. | 264/105 |
| 5,089,356 | 2/1992 | Chung | 428/608 |
| 5,108,849 | 4/1992 | Watkins et al. | 429/30 |
| 5,270,504 | 12/1993 | Grohs et al. | 200/265 |
| 5,928,549 | 7/1999 | Hitzigrath | 219/548 |
| 5,942,347 | 8/1999 | Koncar et al. | 429/30 |
| 5,980,785 | 11/1999 | Xi et al. | 252/512 |
| 6,015,082 | 1/2000 | Kivilahti | 228/180.22 |
| 6,019,272 | 2/2000 | Badgley et al. | 228/114.5 |

*Primary Examiner*—Patrick Ryan
*Assistant Examiner*—Jonathan Johnson
*Attorney, Agent, or Firm*—Dennison, Scheiner, Schultz & Wakeman

[57] ABSTRACT

A process for fixing a graphite-rich material onto a metallic body by mixing graphite powder with a plastic material to obtain a graphite-rich material, pressing the graphite-rich material onto a layer of a metal-rich material, in a single step, forming thereby a green pressing formed of a graphite-rich component and a metal-rich layer, aligning the green pressing with the metallic body to which it is to be fixed, and subjecting the aligned metallic body and green pressing to a heat treatment to bond the metal-rich layer to the metallic body.

10 Claims, No Drawings

PROCESS FOR FIXING A GRAPHITE-RICH MATERIAL ONTO A METALLIC BODY

BACKGROUND OF THE INVENTION

The invention concerns a process for fixing a graphite-rich material onto a metallic body.

In many graphite applications, it is advantageous, and sometimes necessary, to fix the graphite onto a metallic body in such a manner as to give good heat- and/or electricity-conductivity. This is so in the case of sliding bow current collectors, grounding contacts, graphite linings in fusion reactors and in electrical contacts in general.

According to the present state of technology, such fixings or bondings are produced by soldering, in which the graphite surface requires elaborate preparation in order to achieve an anchorage of the solder in the graphite material.

SUMMARY OF THE INVENTION

The invention is based on the task of simplifying the fixing process and yet still achieving reliable fixing.

To achieve this and other objects, the invention is directed to a method for fixing a graphite-rich material onto a metallic body, comprising the steps of:

mixing graphite powder with a plastic material to obtain a graphite-rich material;

pressing the graphite-rich material onto a layer of a metal-rich material, in a single step, forming thereby a green pressing comprising a graphite-rich component and a metal-rich layer;

aligning the green pressing with the metallic body to which it is to be fixed; and subjecting the aligned metallic body and green pressing to a heat treatment to bond the metal-rich layer to the metallic body.

DETAILED DESCRIPTION OF THE INVENTION

According to the invention, the prior processes are simplified in that a metal-rich layer, especially a solder layer, and a graphite-rich layer, comprising graphite and a smaller amount of plastic, may be pressed together in a single process step, and are then sintered onto a metallic body, during which the graphite-rich layer simultaneously hardens. The green pressing resulting from the pressing of the metal-rich layer and graphite-rich layer is aligned with the metallic body, i.e. a formed shape, and subjected to heat treatment, with or without a protective gas, so that the formed object comprising graphite and plastic additive hardens in the case of a thermosetting resin, or is cemented in the case of a thermoplastic material, and the metal-rich layer, i.e. the solder, forms a lasting bond by fusion with the metallic object. This dispenses with the intermediate steps necessary in the prior art, and a more cost-favorable manufacture is achieved.

In the present specification, the term "green pressing" is understood to mean an unsintered pressing, a "metal-rich" material is understood to mean a material with a graphite content of at least 50% by weight and a graphite-rich material is least 50% by weight and a graphite-rich material is understood to mean a material with a graphite content of at least 50% by weight.

The plastic materials used to form the graphite-rich materials are thermosetting resins, including those materials known in the art as "duroplasts." Thermosetting resins are generally present in the graphite-rich material in an amount of 8 to 25% by weight. The plastic material may also be a thermoplastic, which is generally present in the graphite-rich material in an amount of 3 to 15% by weight.

The metal-rich layer of the invention is preferably tin or a tin-lead alloy, and the metallic body can be a copper body.

SUMMARY

In a simplified process for the fixing of a graphite-rich material onto a metallic body and which gives reliable bondings, the graphite-rich material contains a hardenable duroplast. This is pressed together with a metal-rich layer in one pressing process to form an unsintered pressing which contains a graphite-rich component. The pressing is then aligned with the metallic body and, in one process step, then subjected to a temperature treatment during which not only the duroplast in the graphite-rich material hardens but the metal-rich layer also forms a close bond with the metallic body.

What is claimed is:

1. A process for fixing a graphite-rich material onto a metallic body, comprising the steps of:

mixing graphite powder with a plastic material to obtain a graphite-rich material;

pressing the graphite-rich material onto a layer of a metal-rich material, in a single step, forming thereby a green pressing comprising a graphite-rich component and a metal-rich layer;

aligning the green pressing with the metallic body to which it is to be fixed; and subjecting the aligned metallic body and green pressing to a heat treatment to bond the metal-rich layer to the metallic body.

2. A method according to claim 1, wherein the plastic material is a thermosetting resin.

3. A method according to claim 2, wherein the graphite-rich material contains between 8 and 25% by weight of the thermosetting resin.

4. A method according to claim 1, wherein the plastic material is a thermoplastic material.

5. A method according to claim 4, wherein the graphite-rich material contains between 3 and 15% by weight of the thermoplastic material.

6. A method according to claim 1, wherein the metal-rich layer is tin or a tin alloy.

7. A method according to claim 6, wherein the metal-rich layer comprises solder.

8. A method according to claim 1, wherein the metallic body comprises copper.

9. A method according to claim 1, wherein the graphite-rich material comprises at least 50% by weight graphite.

10. A method according to claim 1, wherein the metal-rich layer comprises at least 50% by weight metal.

* * * * *